INVENTOR
Ervin Hengstler

BY
Michael J. Striker
ATTORNEY

Nov. 7, 1967  E. HENGSTLER  3,351,170
APPARATUS FOR REGULATING THE OPERATION OF HYDRAULIC CLUTCHES
Filed Sept. 9, 1965  2 Sheets-Sheet 2

INVENTOR
*Erwin Hengstler*

BY
*Michael J. Striker*
ATTORNEY

United States Patent Office 3,351,170
Patented Nov. 7, 1967

3,351,170
APPARATUS FOR REGULATING THE OPERATION OF HYDRAULIC CLUTCHES
Erwin Hengstler, Waldstrasse 2, Schenkenzell,
Black Forest, Germany
Filed Sept. 9, 1965, Ser. No. 485,983
Claims priority, application Germany, Sept. 11, 1964,
H 53,757
12 Claims. (Cl. 192—87.15)

ABSTRACT OF THE DISCLOSURE

A hydraulic pressure regulating apparatus in which conduit means connect a source of pressure fluid to a plurality of clutches for actuating the latter, and is which a control unit is installed in the conduit means for controlling the pressure of the fluid passing therethrough in such a manner so that the fluid pressure gradually increases from a minimum to a maximum value within a predetermined time interval to assure a soft engagement of the clutches.

Figure 1:
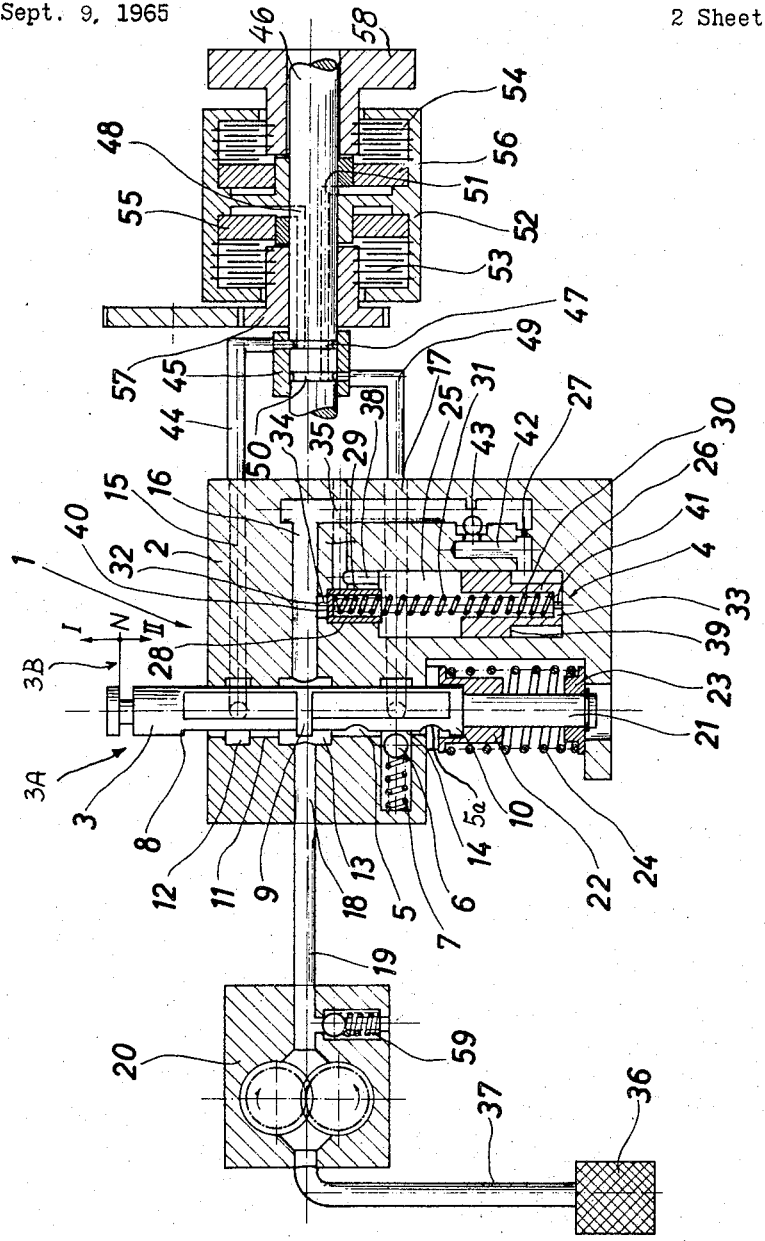

The present invention relates to an apparatus for regulating the operation of hydraulic clutches. More particularly, the invention relates to an apparatus which may control the operation of a plurality of hydraulic clutches in or on a tractor for use in agricultural work, in or on a bulldozer or a similar machine which is used in construction industry, or in analogous machines.

Many heretofore known apparatus which regulate the operation of hydraulic clutches function in such a way that the clutches are applied rather suddenly. This is undesirable in many instances, for example, when a clutch is utilized to set in motion a tractor or another heavy-duty vehicle. The vehicle which embodies such conventional apparatus will be started suddenly which results in considerable wear on the motion transmitting parts. Also, a driven element of the vehicle (such as a mowing attachment, a scoop or the like) is likely to be set in motion without gradual transition from zero speed to maximum speed.

Accordingly, it is an important object of the present invention to provide a novel apparatus which may be utilized for regulating the operation of one or more hydraulic clutches in such a way that the clutches may transmit torque at a gradually increasing rate, beginning at zero speed and ending at maximum speed.

Another object of the invention is to provide an apparatus of the just outlined characteristics which can increase the torque at a fully controlled rate so that the transmission of full torque will take place with a predetermined delay.

A further object of the invention is to provide the apparatus with a novel control unit which can determine with requisite accuracy the pressure to which the clutches are subjected, which occupies little room, which can be installed in many types of vehicles and other machines wherein one or more hydraulic clutches must transmit torque at an accurately controlled rate, and which can be readily coupled with a conventional transmission of the type used in modern tractors or analogous vehicles.

An additional object of the instant invention is to provide a hydraulic regulating apparatus which can be installed, at least in part, directly in the oil tank of a tractor, which is of rugged and compact design, which can apply one or more clutches in a simultaneous step, and which (if desired) can bring about sudden operation of clutches when such sudden operation is required.

Still another object of the invention is to provide a novel system of valves which may be utilized in an apparatus of the above outlined characteristics.

Briefly stated, one feature of the present invention resides in the provision of an apparatus for regulating the operation of one or more hydraulic clutches of the type having driven elements and driving elements operative to transmit torque to the driven elements in response to fluid pressure. In its simplest form, the apparatus comprises a plurality of hydraulic clutches, a source of pressure fluid normally including a hydraulic pump or the like, conduit means connecting the source with the clutches, and a control unit installed in the conduit means. The control unit includes pressure regulating valve means for increasing the pressure of fluid which is admitted to the clutch means so that such pressure rises gradually from a minimum value to a maximum value within a predetermined interval of time.

The control unit further comprises a housing which accommodates the pressure regulating valve means and which also accommodates a flow regulating valve arranged to control the flow of fluid to the pressure regulating valve means. The flow regulating valve may be combined with an auxiliary valve which is installed in the conduit connecting the housing with the source. In certain machines, the apparatus will comprise adjustable distributor means for regulating the flow of fluid through a system of bypass conduits and directly to one or more clutches.

Figure 2:
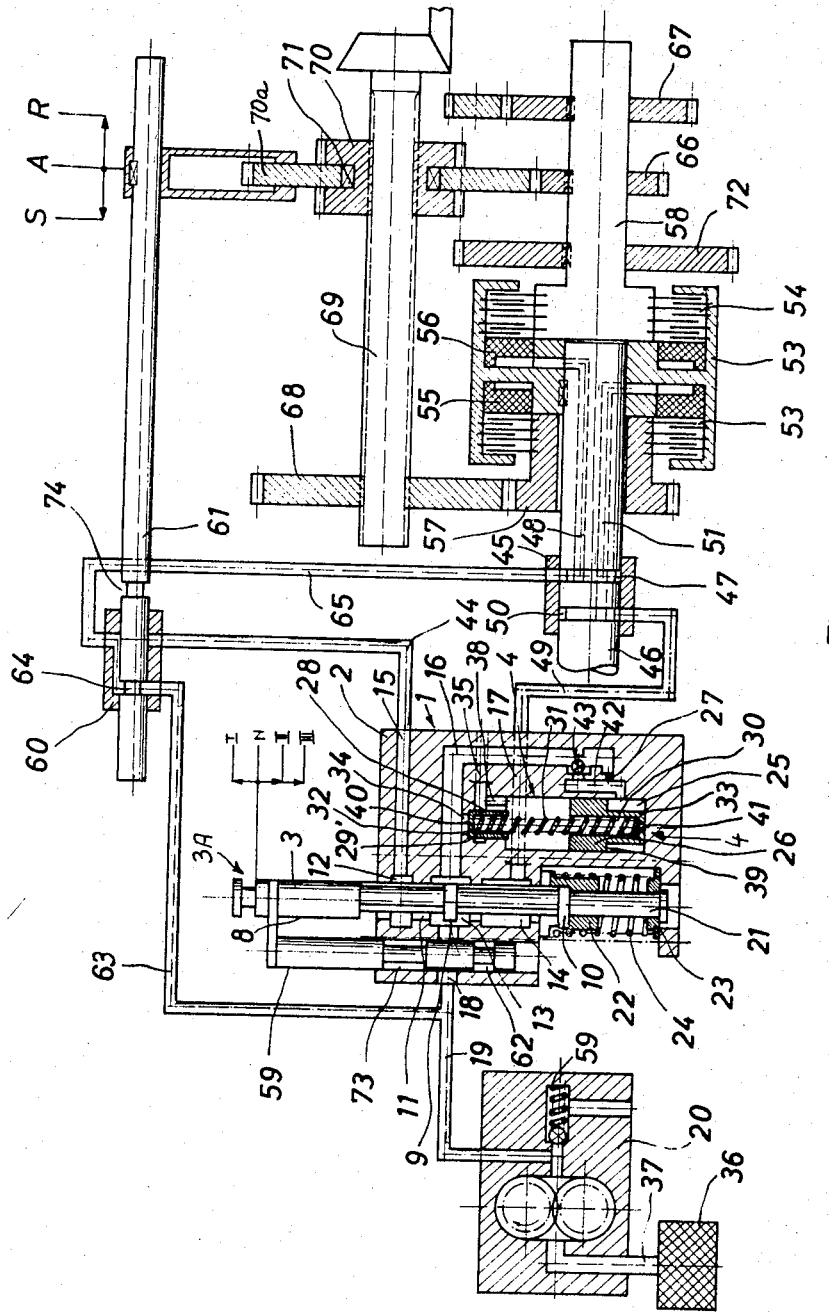

The novel features which are considered as characteristic of the invention are set forth in particular in the appended claims. The improved regulating apparatus itself, however, both as to its construction and its mode of operation, together with additional features and advantages thereof, will be best understood upon perusal of the following detailed description of certain specific embodiments with reference to the accompanying drawings, in which:

FIG. 1 is a diagrammatic sectional view of a regulating apparatus which embodies one form of the present invention and whose control unit is arranged to control the operation of two hydraulic disk clutches; and FIG. 2 is a similar diagrammatic sectional view of a modified hydraulic apparatus whose control unit comprises an auxiliary valve and wherein, in certain stages of operation, both clutches may be actuated at the same time.

Referring first to FIG. 1, there is shown a hydraulic apparatus which is utilized to regulate the operation of a plurality of disk clutches. The apparatus is arranged to actuate one clutch at a time in such a way that torque transmitted by the momentarily active clutch increases gradually and at a fully controlled rate.

The apparatus comprises a control unit 1 which is accommodated in the gear box (not shown) of a transmission of the type used, for example, in an agricultural machine, an earth moving machine or the like. This control unit 1 comprises a housing 2, a fluid flow regulating valve 3A, and a pressure regulating valve 4. The fluid flow regulating valve 3A comprises an elongated valve member or plunger 3 which is reciprocable in an open-ended bore 11 of the housing 2 and is movable between three different axial positions I, N and II by an actuating device including a system of levers 3B or the like. The periphery of this plunger 3 is provided with a pair of axially spaced concave recesses or notches 5, 5a each of which may receive a ball 6 forming part of a detent which further includes a compressed spring 7 accommodated in a blind bore of the housing 2. When the ball 6 extends into the lower notch 5a, the plunger 3 is yieldably held in the end position I; when the ball 6 extends into the notch 5, the plunger 3 is yieldably retained in the end position II. The plunger 3 is further provided with three axially spaced sealing portions or rings 8, 9 and 10 which are dimensioned in such a way that they are free to slide in but can seal selected portions of the bore 11 in the housing 2. This housing is formed with three internal compartments 12, 13 and 14 which are machined into the surface surrounding the bore 11 so that each of these compartments actually constitutes an enlarged zone of the bore 11. The compartments 12, 13, 14 respectively communicate with a first coupling duct 15, with a feed duct 16, and with a second coupling duct 17, all of these ducts being machined into the housing 2. The housing is also formed with an inlet 18 which is located opposite the feed duct 16 and communicates with the median compartment 13. This inlet 18 is connected with the discharge end of a supply conduit 19 which is connected to the pressure side of a source of pressure fluid here shown as a gear pump 20. The suction side of the pump 20 is connected with a suction conduit 37 which dips into the supply of hydraulic fluid (preferably oil) in the gear box of the aforementioned transmission and draws such fluid through a suitable filter 36. The pump 20 is provided with a conventional one-way ball valve 59 which serves as a pressure relief valve and may discharge into the gear box when the pressure in the supply conduit 19 rises above a permissible value.

The plunger 3 comprises a smaller-diameter extension 21 which projects from the housing 2 and carries two axially spaced spring retainers 22, 23. A helical expansion spring 24 is inserted between the retainers 22, 23 and serves to normally hold the plunger 3 in the median or neutral position N. The upper spring retainer 22 normally bears against an annular shoulder of the plunger 3 and the lower retainer 23 normally bears against a projecting ledge of the housing 2 as clearly shown in the lower part of FIG. 1.

The feed duct 16 discharges into a cylindrical chamber 25 which accommodates a portion of the pressure regulating valve 4. The connection between the feed duct 16 and chamber 25 comprises a constriction or throttling passage 27 which is adjacent to the discharge end of the duct 16. The chamber 25 accommodates a substantially T-shaped pressure increasing piston 26 having an annular face 39 which may be subjected to the pressure of fluid entering through the constriction 27. The chamber 25 communicates with a smaller-diameter chamber 28 which is coaxial therewith and receives a reciprocable sealing piston 29. The pistons 26, 29 are respectively provided with axially extending blind recesses or bores 30 which receive the end portions of a prestressed helical expansion spring 31. The end convolutions of the spring 31 bear against the bottom walls 33, 32 of the pistons 26, 29 thus tending to move the pistons apart whereby the outer end face of each piston normally bears against the respective end wall in the corresponding chamber. Such mounting of the spring 31 allows for a substantial reduction in the dimensions of the housing 2. A port 34 connects the feed duct 16 with the chamber 28 so that fluid entering the port 34 may exert a pressure against the top end face 40 of the sealing piston 29. The chamber 28 further communicates with an outlet 35 which can discharge fluid back into the gear box, i.e., into that space from which the suction conduit 37 draws fluid in response to operation of the pump 20. The space between the pistons 26, 29 forms part of the chambers 25, 28 and normally communicates with the outlet 35 through a port 38.

The area of the annular face 39 on the pressure increasing piston 26 may exceed about four times the area of the top end face 30 of the sealing piston 29. The bottom wall 33 of the piston 26 is formed with an axial bleed orifice or constriction 41 through which fluid entering the chamber 25 via constriction 27 may penetrate into the space between the pistons 26, 29 to enter the outlet 35 through the port 38. A bypass tunnel 42 connects portions of the feed duct 16 upstream and downstream of the constriction 27 and contains a one-way ball valve 43 which permits flow of fluid from downstream to upstream of the constriction 27.

The coupling duct 15 discharges into a connecting conduit 44 leading to a header or manifold 45 which rotatably receives a drive shaft 46. The fluid discharged from the connecting conduit 44 enters a circumferential groove 47 in the drive shaft 46 and thereupon flows through an axially extending bore 48 into a cylinder chamber located behind an annular driving or compressing element 55 in the cylindrical casing 52 of a dual clutch. The fluid pressure acting against the right-hand side of the compressing element 55 will cause the latter to move in a direction to the left and to compress a stack of clutch disks 53 some of which are axially movably secured to the casing 52. The remaining disks 53 are axially movably connected with the hub of a driven clutch element 57 which is set in rotary motion and begins to rotate in response to rotation of the drive shaft 46 when the pressure in the bore 48 suffices to effect requisite compression of clutch disks 53, i.e., such compression that the disks which are non-rotatably secured to the casing 52 entrains the disks which are non-rotatably secured to the driven clutch element 57 The casing 52 rotates with the drive shaft 46.

The other coupling duct 17 discharges into a second connecting conduit 49 leading to the manifold 45 and discharging into a second circumferential groove 50 of the drive shaft 46. The latter has an axially extending bore 51 which discharges into a chamber provided behind a driving or compressing element 56 forming part of a second clutch. The casing 52 is common to both clutches and accommodates a second set of clutch disks 54 which are pressed against each other when the left-hand side of the compressing element 56 is subjected to requisite fluid pressure. The disks 54 of the second clutch can rotate a second driven clutch element 58.

The operation of the regulating apparatus is as follows:

When the spring 24 maintains the plunger 3 in the neutral position N and the pump 20 is driven, fluid is drawn via suction conduit 37 and flows through the supply conduit 19 and inlet 18 to enter the compartment 13 in the housing 2 of the control unit 1. The sealing rings 8, 9 and 10 then allow such fluid to flow axially toward and through both ends of the bore 11 and to escape back into the source from which the suction conduit 37 draws it back into the pump 20. Therefore, the pump 20 cannot build up any pressure in the ducts 15, 16 and 17, i.e., these ducts are merely filled with fluid which means that the packages of clutch disks 53, 54 are not compressed and the drive shaft 46 can rotate with reference to the clutch elements 57 and 58.

If the operator thereupon causes the actuating device 3B to shift the plunger 3 to the end position I, the ball 6 of the detent means enters the notch 5a and yieldably holds the plunger in such end position. The ring 9 of the plunger 3 seals the compartment 12 from the compartment 13, and the ring 10 seals the compartment 14 from the open lower end of the bore 11. In other words, pressure fluid entering at 18 and flowing into the median compartment 13 can flow into the feed duct 16 and also into the lower coupling duct 17 because the compartments 13 and 14 are free to communicate with each other. Shortly thereafter, fluid pressure in the ducts 16 and 17 rises and the thus compressed fluid exerts a pressure in the port 34 to act against the top end face 40 of the sealing piston 29. The bias of the spring 31 is assumed to be selected in such a way that this spring yields and allows the piston 29 to move downwardly when the fluid pressure in the port 34 (and acting against the end face 40) rises to about 3 atmospheres absolute pressure. As the piston 29 moves downwardly, it allows compressed fluid to flow from the port 34 into the outlet 35 and back to the source. Consequently, and for the time being, the pressure in the ducts 16 and 17 ceases to rise. However, fluid entering the duct 16 also penetrates through the constriction 27 and into the lower part of the chamber 25 where it acts against the annular face 39 of the piston 26. The area of the annular face 39 exceeds substantially the area of the end face 40 on the piston 29; therefore, the piston 26 begins to rise after a predetermined interval of time and causes the spring 31 to store energy by simultaneously causing further compression of fluid in the feed duct 16. The piston 26 continues to move upwardly and finally comes into abutment with an annular shoulder or stop at the upper end of the chamber 25. Such abutment can take place at a pressure of about 8 atmospheres absolute pressure. In the meantime, i.e., while the piston 26 moves upwardly, the piston 29 remains spaced from the upper end of the chamber 28 and allows fluid to flow from the port 34 into the outlet 35. The second constriction 41 contributes to a delay in upward movement of the piston 29 by allowing compressed fluid to penetrate to the upper side of the piston 26 and to enter the outlet 35 via port 38. The second constriction 41 insures that the curve representing the rise in pressure of fluid in the ducts 16 and 17 resembles an ideal straight line. The provision of the constriction 41 brings about another important advantage, namely, that the dimensions of the pressure regulating valve 4 can be much smaller than if this valve were provided with a single constriction. The diameter of the passage defined by the constriction 27 and/or 41 cannot be too small because this could lead to frequent clogging (as a rule, the diameter of such passages should not be less than 0.5 mm.); on the other hand, the rise in pressure to a desired maximum value should normally be achieved as soon as possible, preferably within an interval of less than 5 seconds.

As the piston 26 moves into actual abutment with the annular shoulder at the upper end of the chamber 25, it also abuts against the piston 29 and causes the latter to move upwardly so as to seal the port 34 from the outlet 35. At the same time, the piston 26 seals the port 38 from the chamber 25 so that the outlet 35 is completely sealed from the feed duct 16. The coupling duct 17 is also sealed from the outlet 35 so that pressure prevailing in the ducts 16 and 17 may rise to about 10 atmospheres absolute pressure, depending on the setting of the relief valve 59 in the pump 20.

The pressure in the coupilng duct 17 rises at the same rate as in the feed duct 16. Thus, when the pressure first rises to about 3 atmospheres absolute pressure, fluid flowing through the connecting conduit 49, manifold 45, groove 50 and bore 51 exerts upon the compressing element 56 a pressure which causes the clutch disks 54 to move forward and to rub against each other without, however, rotating the clutch element 58. As the pressure in the coupling duct 17 continues to rise, the disks 54 begin to transmit torque at a gradually increasing rate until, finally, the pressure in the duct 17 rises sufficiently to insure that the driven element 58 rotates at the exact speed of the drive shaft 46. The delay which is required by the hydraulic apparatus to transmit to the element 58 a maximum torque may be determined in advance. The rise in torque is gradual so that the operation of the clutch is smooth.

If the driven element 58 is to be disengaged from the drive shaft 46, the plunger 3 is moved back to the neutral position N so that fluid entering the median compartment 13 can escape at both axial ends of the bore 11. The pressure in the ducts 16 and 17 drops so that the spring 31 can expand and returns the piston 26 to the position shown in FIG. 1 whereby the fluid filling the lower part of the chamber 25 escapes through the bypass tunnel 42 and via one-way valve 43. The compressing element 56 returns to its left-hand end position and allows the clutch disks 54 to become disengaged from each other.

The manner in which pressure fluid can cause the shaft 46 to drive the clutch element 57 is analogous. All that the operator has to do is to shift the plunger 3 to the end position II so that the ring 8 seals the upper end of the bore 11 and the ring 9 seals the compartment 14 from the compartment 13. The compartments 12 and 13 are free to communicate with each other and the duct 15 conveys compressed fluid via conduit 44, manifold 45, groove 47 and bore 48 as soon as the duct 16 is sealed from the outlet 35 in the aforedescribed manner. The fluid flowing through the bore 48 exerts gradually increasing pressure against the annular driving element 55 which compresses the clutch disks 53 so that the driven element 57 begins to rotate and is ultimately accelerated to the speed of the drive shaft 46. The parts 46, 57 will begin to rotate at the same speed with a delay which can be determined in advance by proper selection of effective surfaces on the pistons 26, 29, by proper selection of the bias of the spring 31, and/or by proper dimensioning of the constrictions 27 and 41.

The diameters of constrictions 27 and 41 determine the exact duration of the delay with which the pressure in the coupling duct 15 or 17 rises to the maximum pressure determined by the pump 20 and its relief valve 59. Very good results were achieved with regulating apparatus wherein the diameter of the downstream constriction 41 equals or at least approximate the diameter of the upstream constriction 27 and wherein the area of the annular face 39 on the pressure increasing piston 26 exceeds about four times the area of the top end face 40 on the sealing piston 29. The bypass tunnel 42 allows for rapid evacuation of fluid from the space below the piston 26 when the plunger 3 is moved to neutral position and the spring 31 expands.

FIG. 2 illustrates a somewhat modified hydraulic regulating apparatus which is particularly suited for use in tractors of the type used in agricultural work. Such tractors are usually provided with several motion transmitting groups or assemblies which can be coupled to the main transmission independently of the shifting or switching gear. One distinguishes between a so-called "road" group or assembly S, an "agricultural" group or assembly A, and a "reverse operation" group or assembly R. Each of these assemblies can be driven at the desired transmission ratio depending upon whether the tractor is operated on the road (S), in the field (A) and should drive a takeoff for performing additional work (i.e., in addition to driving the wheels), or is operated in reverse (R). In certain situations, such assemblies should be rendered operative independently of the shifting or switching means. For example, when the tractor is used in the field, the operator should be able to switch from operation with one clutch (disks 53) to operation with the other clutch (disks 54) or vice versa without bringing the vehicle to a halt, even when the tractor is called upon to perform a work at maximum load (such as plowing, hauling heavy weights, or the like).

In accordance with the present invention, this can be achieved by providing the regulating apparatus with an auxiliary valve including an auxiliary valve member or plunger 59 which controls the flow of oil or another suitable hydraulic fluid to the bore 11 for the main valve member or plunger 3. The plungers 3 and 59 are coupled to each other in such a way that, when the main plunger 3 is moved to the neutral position N, the auxiliary plunger 59 prevents flow of compressed fluid from the inlet 18 to the median compartment 13 of the housing 2 so that the bore 11 is sealed from the pump 20. In other words, in the neutral position N of the main plunger 3, fluid delivered by the pump 20 cannot flow directly to the source, for example, into the gear box or into an oil tank. Consequently, when the main plunger 3 is shifted from the end position I to the position II and moves through the neutral position N, the pressure of fluid does not decrease to zero and the clutch which was active in the position I remains active while the main plunger 3 moves through the position N. This means that the tractor does not come to a halt when the operator decides to shift from the position I to the position II because one of the driving elements, in the illustrated embodiment the element 55, remains under maximum pressure and keeps the clutch disks 53 in engagement to drive the element 57 at the exact speed of the drive shaft 46.

The auxiliary valve cooperates with an adjustable distributor 60 whose operation may be controlled by a shiftable actuating member or rod 61. The rod 61 also controls the operation of the motion transmitting assemblies S, A and R.

The basic operation of the regulating apparatus (including the parts mounted in the housing 2 of the control unit 1) is the same as described in connection with FIG. 1. Therefore, I will now describe various phases of the operation without going into details of the manner in which the valves 3A and 4 respectively regulate the flow and pressure of hydraulic fluid in the ducts 15, 16 and 17. It is now assumed that the assembly A is rendered operative (i.e., that the rod 61 has been shifted to the position shown in FIG. 2), and that the main plunger 3 is in the end position I. Pressure fluid coming from the pump 20 flows through the supply conduit 19 and inlet 18 and enters an annular groove 62 with is machined into the auxiliary plunger 59. It is to be noted that the plunger 59 is not in the axial position of FIG. 2 because it is coupled to the main plunger 3 and because the latter has been moved to the end position I. From the groove 62, the fluid flows into the ducts 16 and 17 and its pressure rises gradually in a manner as described in connection with FIG. 1 so that the driving or compressing element 55 is forced to move in a direction to the left and to press the clutch disks 53 against each other whereby, after a predetermined delay, the driven element 57 rotates at the exact speed of the drive shaft 46. At the same time, compressed fluid flows from the supply conduit 19 and into a branch conduit or bypass conduit 63 which leads to the distributor 60. The rod 61 is formed with a circumferential groove 64 which registers with the discharge end of the bypass conduit 63 and allows compressed fluid to enter a further branch conduit or bypass conduit 65 leading to the groove 47 in the periphery of the drive shaft 46. The bypass conduit 65 can be an extension of the coupling duct 15 or of the supply conduit 19. The fluid which enters the groove 47 flows through the axially parallel bore 48 of the shaft 46 and exerts a pressure against the driving element 56 which biases the clutch disks 54 against each other so that the element 58 also rotates with the drive shaft 46. During starting, the acceleration of the driven element 58 takes place with the same delay as that of the driven element 57.

The driven element 58 carries a first gear 72 which transmits motion when the tractor travels on a road, a second gear 66 which transmits motion when the tractor is in use on the field, and a third gear 67 which can drive the tractor in reverse. The clutch element 57 has an annulus of teeth meshing with a gear 68 on a driven shaft 69 which also carries a gear 70a meshing with the gear 66 on the clutch element 58. The gear 70a can drive the shaft 69 through the intermediary of an overrunning clutch 71 and a dual gear 70 which is rigidly secured to the shaft 69. The provision of the overrunning clutch 71 is necessary to prevent clashing of teeth because the shaft 69 can be driven simultaneously by both elements 57, 58. When the gear 70 meshes with the gear 72 or 67, the gear 68 is out of mesh with the element 57 and the gear 70a is out of mesh with the gear 66 so that the shaft 69 is then driven solely by the gear 72 or 67, i.e., solely by the element 58.

In the position I of the main plunger 3, the ring 9 seals the compartment 12 from the compartment 13 and the ring 10 seals the open lower end of the bore 11 so that fluid which is admitted into the compartment 13 can flow into the feed duct 16 as well as into the coupling duct 17 (along a portion of the bore 11 and through the compartment 14).

If the main plunger 3 is shifted to the neutral position N and the rod 61 remains in the position of FIG. 2, the parts of the hydraulic apparatus will assume positions which are actually shown in FIG. 2. It will be seen that the auxiliary plunger 59 then seals the supply conduit 19 from the median compartment 13 so that the ducts 15–17 are completely sealed from the pump 20. However, the bypass conduit 63 delivers compressed fluid from the supply conduit 19 to the distributor 60, and such fluid flows through the groove 64 of the rod 61 and into the bypass conduit 65 to enter the groove 47, bore 48 and the chamber behind the element 56 which presses the clutch disks 54 against each other and causes the element 58 to rotate at the speed of the drive shaft 46. In other words, the right-hand clutch of FIG. 2 remains operative despite the fact that the main plunger 3 is moved to the neutral position N. Such neutral position is a temporary position. The element 58 drives the gear 66 at the exact speed of the shaft 46 and the gear 66 drives the shaft 69 via gears 70a, 70 and the overrunning clutch 71. It will be seen that the right-hand clutch (disks 54) remains active regardless of whether the main plunger 3 is moved to the position I, II or N. The left-hand clutch (disks 53) is operated only when the main plunger 3 is shifted to the end position I, i.e., when the tractor must carry out a work which requires a maximum of power.

If the plunger 3 is shifted to the position II and the rod 61 remains in the position of FIG. 2, fluid admitted via inlet 18 flows through a second annular groove 73 of the auxiliary plunger 59 and enters the median compartment 13 of the housing 2 to flow into the ducts 15 and 16. The conduit 44 can communicate with the groove 47 via the aforementioned bypass conduit 65 and distributor 60. The rings 8 and 9 of the main plunger 3 are withdrawn into the bore 11 of the housing 2 so that the fluid can enter the ducts 15 and 16. In the illustrated position of the rod 61, the latter seals the coupling duct 15 and conduit 44 from the bypass conduit 65 so that the conduit 65 can receive compressed fluid only through the bypass conduit 63, groove 64 and distributor 60. Due to the flow of fluid through the pressure regulating valve 4, pressure in the bypass conduit 63 and in the chamber behind the element 56 rises with a predetermined delay which may be changed by adjusting, for example, the bias of the spring 31.

In many instances, the apparatus of FIG. 2 should operate in such a way that the tractor can come to a halt while it is being used in the field without, however, arresting the drive shaft 46. For example, the shaft 46 may be used to drive a mowing attachment or the like. This can be achieved by providing for the main plunger 3 a further axial position III in which the pressure of fluid entering the housing 2 is reduced to zero. The axial length of the second groove 73 in the periphery of the auxiliary plunger 59 is selected in such a way that, when moved to the position III, the plunger 59 allows fluid coming from the supply conduit 19 to enter the housing 2. The ring 8 of the main plunger 3 seals the upper end of the bore 11 but the lower end of this bore remains open so that fluid entering the compartment 13 can enter the compartments 12, 14 and can also escape through the lower end of the bore 11. Thus, the fluid can enter each of the three ducts 15–17 but the apparatus cannot build up a pressure because the lower end of the bore 11 is open and communicates with the compartment 13 which receives fluid from the groove 73 of the auxiliary plunger 59. This means that the two clutches remain inoperative and the shaft 69 is at a standstill.

If the rod 61 is shifted in a direction to the left (S) to activate the motion transmitting group which drives the tractor on the road, the gear 70 on the shaft 69 meshes directly with the gear 72 of the driven element 58. At the same time, the gears 70a, 68 respectively move out of mesh with the gear 66 and driven element 57. The rod 61 seals the bypass conduits 63, 65 from each other but its annular groove 74 allows for communication between the conduits 44 and 65. In the position I of the main plunger 3, fluid can flow through the groove 62 of the auxiliary plunger 59, into the compartment 13, through the feed duct 16 and into the pressure regulating valve 4. At the same time, the compartment 13 communicates with the coupling duct 17 so that fluid flows through the conduit 49 and effects compression of the disks 53 to drive the element 57 with a gradually increasing torque until the element 57 rotates at the exact speed of the drive shaft 46 and drives the shaft 69.

If the rod 61 remains in the position S but the main plunger 3 is caused to move to the position N, the two clutches remain idle because the auxiliary plunger 59 prevents the fluid from entering the compartment 13 in the housing 2. The rod 61 seals the bypass conduits 63, 65 from each other.

If the rod 61 remains in the position S but the main plunger 3 is shifted to the position II, fluid can flow via feed duct 16 to the pressure regulating valve 4 and also through the coupling duct 15, conduit 44, groove 74, conduit 65 and so forth to apply the right-hand clutch of FIG. 2 so that the driven element 58 begins to rotate with a smooth transition from zero speed to the full speed of the drive shaft 46.

If the rod 61 is shifted in a direction to the right, as viewed in FIG. 2, its groove 64 establishes a passage between the conduits 44 and 65. By moving the main plunger 3 to the position I, the operator admits fluid to the ducts 16, 17 so that the clutch disks 53 are caused to transmit torque to the driven element 57. The bypass conduit 63 delivers compressed fluid to the bypass conduit 65 so that the disks 54 also transmit torque and drive the element 58.

The plungers 3 and 59 are preferably rigidly connected with each other. The bypass conduit 63 may admit pressure fluid to one of the clutches in such a way that the clutch is immediately subjected to maximum pressure. When moved to neutral position, the auxiliary plunger 59 prevents inflow of fluid into the housing 2.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a hydraulic regulating apparatus, in combination, a source of hydraulic fluid; a plurality of hydraulic clutches having driven elements and driving elements operative to transmit torque to driven elements in response to fluid pressure; conduit means connecting said source with said clutches; a control unit installed in said conduit means and comprising a housing provided with a bore, pressure regulating valve means in said housing for increasing the pressure which is admitted to said clutches so that such pressure rises gradually from a minimum to a maximum value within a predetermined interval of time, a second valve means in said housing for regulating the flow of fluid to said pressure regulating valve means and said clutches and comprising a valve member movable in said bore between a plurality of positions including a neutral position in which pressure fluid entering said housing from said source is free to escape from said housing without undergoing compression by said pressure regulating valve means; and auxiliary valve means for regulating the admission of pressure fluid from said source to said bore, said auxiliary valve means comprising an auxiliary valve member coupled with said valve member of said second valve means and arranged to prevent entry of fluid into said bore in the neutral position of said valve member of said second valve means.

2. In a hydraulic regulating apparatus, in combination, a source of hydraulic fluid; a plurality of hydraulic clutches having driven elements and driving elements operative to transmit torque to driven elements in response to fluid pressure; conduit means connecting said source with said clutches; a control unit installed in said conduit means and comprising a housing provided with a bore, pressure regulating valve means in said housing for increasing the pressure which is admitted to said clutches so that such pressure rises gradually from a minimum to a maximum value within a predetermined interval of time, a second valve means in said housing for regulating the flow of fluid to said pressure regulating valve means and said clutches and comprising a valve member movable in said bore between a plurality of positions including a neutral position in which pressure fluid entering said housing from said source is free to escape from said housing without undergoing compression by said pressure regulating valve means; bypass conduit means connecting said source with said clutches; and adjustable distributor means in said bypass conduit means for regulating the flow of fluid to said clutches via said bypass conduit means.

3. In a hydraulic regulating apparatus, in combination, a source of hydraulic fluid; a plurality of hydraulic clutches having driven elements and driving elements operative to transmit torque to driven elements in response to fluid pressure; conduit means connecting said source with said clutches; and a control unit installed in said conduit means and comprising a housing having a feed duct, pressure regulating valve means in said housing for increasing the pressure which is admitted to said clutches so that such pressure rises gradually from a minimum to a maximum value within a predetermined interval of time, and second valve means for regulating the flow of fluid to said feed duct and said clutches, said pressure regulating valve means comprising elongated chamber means formed in said housing, a sealing piston slidably guided in one end portion of said chamber means, a pressure increasing piston slidably guided in the opposite portion of said chamber means, resilient means between said pistons and urging the same apart to yieldably maintain said pistons in end positions in which end walls thereof respectively engage opposite ends of said chamber means, an outlet communicating with said chamber means and being closed by said sealing piston in said end position of the latter, a port providing communication between said feed duct and said one end portion of said chamber means so that upon increase of pressure in said duct said sealing piston is displaced against the pressure of said resilient means to provide through said port communication between said duct and said outlet, a passage providing communiaction between said duct and said opposite end of said chamber means, a first constriction in said passage, said pressure increasing piston having a face which is subjected to the pressure of fluid passing through said first constriction whereby such fluid tends to move said pressure increasing piston against the bias of said resilient means, said pressure increasing piston being provided with a second constriction located downstream of said first constriction and providing communication between said passage and the space in said chamber means between said pistons, and a second port connecting said space with said outlet so that fluid entering said space via said second constriction may be evacuated from said housing via said outlet.

4. A structure as set forth in claim 3, wherein the cross-sectional area of said second constriction at least approximates the cross-sectional area of said first named constriction and wherein said sealing piston has a face which is subjected to the pressure of fluid in said port, the area of the face on said pressure increasing piston exceeding about four times the area of the face on said first piston.

5. A structure as set forth in claim 3, wherein said housing is provided with a tunnel connecting portions of said duct upstream and downstream of said constriction, and further comprising one-way valve means provided in said tunnel for permitting flow of fluid from downstream to upstream of said constriction.

6. A structure as set forth in claim 3, wherein said housing is provided with a bore and said second valve means comprises a valve member movable in said bore between a plurality of positions including a neutral position in which pressure fluid entering the housing from said source is free to escape from the housing without undergoing compression by said pressure regulating valve means.

7. A structure as set forth in claim 6 wherein, in another position thereof, said valve member admits pressure fluid to said pressure regulating valve means and to at least one of said clutches so that the pressure of fluid which enters said one clutch rises at a rate determined by said pressure regulating valve means.

8. A structure as set forth in claim 6, further comprising detent means for yieldably holding said valve member in at least some of said positions thereof.

9. A structure as set forth in claim 6, further comprising means for biasing the valve member to said neutral position thereof.

10. A structure as set forth in claim 2, particularly for regulating the flow of pressure fluid to a pair of hydraulic clutches in an agricultural machine, further comprising actuating means movable to a plurality of positions for controlling the flow of fluid via said bypass conduit means.

11. A structure as set forth in claim 10, wherein said valve member is movable to a second position in which said second valve means prevents the flow of fluid to said clutches via said housing and said actuating means is movable to a position in which at least one of said clutches receives fluid at full pressure directly via said bypass conduit means.

12. A structure as set forth in claim 11, wherein said actuating means is movable to a second position in which said bypass conduit means is sealed so that, on movement of said valve member to said second position thereof, all of said clutches are sealed from said source.

References Cited

UNITED STATES PATENTS

| | | | |
|---|---|---|---|
| 2,807,968 | 10/1957 | Forster | 192—109 X |
| 3,042,165 | 7/1962 | Yokel | 192—109 X |
| 3,202,018 | 8/1965 | Hilpert | 192—3.22 X |
| 3,215,236 | 11/1965 | Pensa | 192—109 X |

DONLEY J. STOCKING, *Primary Examiner.*

ARTHUR T. McKEON, *Examiner.*